United States Patent Office 3,515,759
Patented June 2, 1970

3,515,759
PREPARATION OF ALCOHOLS
Robert A. Dombro, Chicago, Ill., assignor to Universal Oil Products Company, Des Plaines, Ill., a corporation of Delaware
No Drawing. Filed Jan. 11, 1968, Ser. No. 697,009
Int. Cl. C07c 29/00
U.S. Cl. 260—618　　　　　　　　　　　　　　9 Claims

ABSTRACT OF THE DISCLOSURE

Alcohols are prepared by treating a sulfoxide with an alkali or alkaline earth metal hydroxide in an organic solvent at elevated temperature, specific examples being the preparation of n-butyl alcohol by treating di-n-butyl sulfoxide with sodium hydroxide in an ethyl alcohol solvent, the preparation of n-hexyl alcohol by similar treatment of n-hexyl phenyl sulfoxide, and the preparation of β-phenylethyl alcohol by similar treatment of di-β-phenylethyl sulfoxide.

---

This invention relates to a process for the preparation of alcohols and is particularly suited to the preparation of primary aliphatic alcohols. More specifically, the invention is concerned with a process for treating or converting a symmetrical or unsymmetrical sulfoxide to an alcohol in the presence of an alkaline material and an organic solvent at conversion conditions.

Alcohols, and particularly primary alcohols, will find a wide variety of uses in the chemical field. For example, n-butyl alcohol is especially useful in the preparation of esters, especially butyl acetate, as a solvent for resins and coatings, as a plasticizer, hydraulic fluids, detergent formulations, etc. Likewise, 1-octanol and β-phenylethyl alcohol may be used in cosmetics, perfumes, as solvents or as anti-foaming agents. Another primary alcohol such as 1-decanol is also used as a perfume intermediate, in making detergents and esters as well as being used in the preparation of lube oil additives, plasticizers, adhesive and metal polishes. Other alcohols such as 1-tetradecanol or 1-hexadecanol will find a use as alkylation agents for the preparation of biodegradable detergents. Inasmuch as there is a rising problem concerning the appearance of foam on the surface of lakes, ponds, streams, rivers, etc. which are sources for the water supply for communities such as cities, towns, villages, etc., it is imperative that new detergents, soaps, etc. must be biodegradable in nature in order that the aforesaid detergents after use thereof will be dispersed and will not tend to collect and to form a nuisance. Heretofore, detergents have been manufactured which are non-biodegradable in nature, the alkyl portion of said molecules consisting of branched-chain substituents. The microorganisms which attack the molecules are unable to consume the branched-chain substituents and therefore the molecules of detergents are not destroyed. However, in contradistinction to these types of compounds it has been found that detergents which are prepared from long-chain alkyl groups which are straight chain in nature and do not contain any branching will be digested by the microorganisms and thus the detergent molecules will be destroyed, thereby preventing the build-up and the formation of the undesired foams.

It is therefore an object of this invention to provide a process for preparing alcohols.

Another object of this invention is to provide a process for preparing primary alcohols which are predominantly straight chain in nature, utilizing readily available starting materials.

In one aspect an embodiment of this invention resides in a process for converting a sulfoxide having the formula:

$$RS(O)R^1$$

in which R and $R^1$ are independently selected from the group consisting of alkyl, cycloalkyl, cycloalkylalkyl, aryl, aralkyl, alkaryl, and methylene groups of from 2 to 11 carbon atoms which together with the sufur form a heterocyclic ring, and comprises treating said sulfoxide with an alkali or alkaline earth metal hydroxide in an alcoholic solvent at an elevated temperature and recovering the resultant alcohol.

A further embodiment of this invention is found in a process for converting a sulfoxide which comprises treating di-n-dodecyl sulfoxide with sodium hydroxide in the presence of an aqueous ethyl alcohol medium at a temperature in the range of from about 100° C. to about 300° C., and recovering the resultant n-dodecyl alcohol.

Other objects and embodiments will be found in the following further detailed description of the present invention.

As hereinbefore set forth, this invention relates to a process for preparing alcohols utilizing a symmetrical or unsymmetrical sulfoxide as the starting material. The reaction is preferably effected at elevated temperatures and in the presence of an alkaline substance in an organic solvent. Sulfoxides which may be converted to alcohols will possess the generic formula $RS(O)R^1$ in which R and $R^1$ are independently selected from the group consisting of alkyl, cycloalkyl, cycloalkylalkyl, aryl, aralkyl, alkaryl, and methylene groups of from 2 to 11 carbon atoms which together with the sulfur form a heterocyclic ring. Specific examples of these compounds will include diethyl sulfoxide, di-n-propyl sulfoxide, diisopropyl sulfoxide, di-n-butyl sulfoxide, di-n-pentyl sulfoxide, di-n-hexyl sulfoxide, di-n-heptyl sulfoxide, di-n-octyl sulfoxide, di-n-nonyl sulfoxide, di-n-decyl sulfoxide, di-n-undecyl sulfoxide, n-dodecyl methyl sulfoxide, etc., and isomers thereof, etc.; dicyclopentyl sulfoxide, dicyclohexyl sulfoxide, dicycloheptyl sulfoxide, dicyclooctyl sulfoxide, cyclopentyl cyclohexyl sulfoxide, etc.; dibenzyl sulfoxide, dinaphthyl sulfoxide, di-o-tolyl sulfoxide, di-m-tolyl sulfoxide, di-p-tolyl sulfoxide, di-phenyl sulfoxide, di-β-phenylethyl sulfoxide, etc.; tetramethylene sulfoxide, pentamethylene sulfoxide, hexamethylene sulfoxide, heptamethylene sulfoxide, octamethylene sulfoxide, nonamethylene sulfoxide, decamethylene sulfoxide, undecamethylene sulfoxide, etc.; n-propyl phenyl sulfoxide, n-hexyl phenyl sulfoxide, etc. It is also contemplated within the scope of this invention that sulfoxides having the formula hereinbefore set forth in which the R and $R^1$ groups contain other substituents such as nitro, amino, hydroxy, etc. may also be converted to primary alcohols, although not necessarily with equivalent results. Some examples of these compounds will include di-(4-chlorobutyl) sulfoxide, di-(6-bromohexyl) sulfoxide, di-(p-nitrophenyl) sulfoxide, etc. It is to be understood that the aforementioned compounds are only representative of the type of sulfoxides which may be used, and that the present invention is not necessarily limited thereto.

As hereinbefore set forth, the present process is effected at elevated temperatures, said temperature being in the range of from about 100° C. to about 300° C. and preferably in a range of from about 150° C. to about 200° C., the residence time during which the reaction takes place being in a range of from about 0.5 up to about 10 hours or more in duration. The sulfoxide is converted to the alcohol in the presence of an alkaline substance. Specific examples of these alkaline substances which may be used include alkali metal or alkaline earth metal hydroxides such as sodium hydroxide, potassium hydroxide, lithium hydroxide, cesium hydroxide, rubidium hydroxide, magnesium hydroxide, calcium hydroxide, strontium hydroxide, etc. Other alkaline substances which may be used, although not necessarily with equivalent results, will include salts of the alkali metals or alkaline earth metals such as sodium carbonate, potassium carbonate, lithium carbonate, magnesium carbonate, etc. In addition, the reaction is effected in an organic solvent medium, said medium comprising an alcoholic or aqueous alcoholic solution. Examples of these solvents will include the lower molecular weight alcohols such as methyl alcohol, ethyl alcohol, propyl alcohol, isopropyl alcohol, etc. and aqueous solutions thereof containing up to about 50 weight percent water and preferably about 10 weight percent water.

The process of this invention may be effected in any suitable manner and may comprise within a batch or continuous type operation. For example, when a batch-type operation is used, a quantity of the sulfoxide to be converted is placed in an appropriate apparatus. In addition, the alkaline substance, which may be in the form of a solution containing from about 10% to about 70% by weight of the alkaline substance along with the particular organic solvent is also placed in the apparatus. The reaction apparatus and contents thereof are then heated to the desired temperature and maintained thereat for the pre-determined residence time. At the end of this time, the apparatus and contents thereof are allowed to return to room temperature, the organic portion is separated from the inorganic portion and subjected to conventional means of separation, said means including fractional distillation, fractional crystallization, etc.

The process of this invention may also be effected in a continuous manner of operation When such type of operation is used, the sulfoxide which is to undergo conversion to an alcohol is continuously charged to a reaction zone which is maintained at the proper operating conditions of temperature and pressure. As hereinbefore set forth, the conversion of the sulfoxide to the alcohol is effected at temperatures in the range of from about 100° C. to about 300° C. In addition, if so desired, it is also contemplated that the reaction may be effected at elevated pressures ranging from about 2 to about 100 atmospheres. The superatmospheric pressure is provided for by the introduction of a substantially inert gas such as nitrogen into the reaction vessel, the amount of pressure used being that which is necessary to maintain a major portion of the reactants in the liquid phase. Likewise, the alkaline substance and the solvent are also continuously charged to the reaction vessel through separate lines or, if so desired, they may be admixed prior to entry to the vessel and charged thereto to a single stream. After a pre-determined residence time has elapsed, the reactive effluent is continuously withdrawn from the vessel. The effluent is subjected to separation means whereby any unreacted starting material, solvent and alkaline substance, are separated from the desired reaction product, the former compounds being recycled to form a portion of the feed stock, while the latter is recovered.

In another embodiment of the process, it is contemplated that the particular sulfoxide which is to be converted to an alcohol may be generated in situ. When generating the sulfoxide in situ, it is possible to utilize compounds such as disubstituted sulfides which may be present in certain hydrocarbon feed stocks as impurities. The generation of the sulfoxide may be effected by carrying out the reaction of the corresponding sulfide with an alkaline substance in an organic solvent in the presence of an oxidizing agent which will convert the sulfide to the sulfoxide. The oxidation may be effected utilizing oxidizing agents such as sodium hypochlorite, calcium hypochlorite, dimethyl sulfoxide, hydrogen peroxide, etc. The sulfoxide generated in situ is then treated in a manner similar to that hereinbefore set forth, that is, with an alkaline substance in an alcoholic or aqueous-alcoholic solvent, to prepare the desired alcohol.

The following examples are given to illustrate the process of the present invention which, however, are not intended to limit the generally broad scope of the present invention in strict accordance therewith.

EXAMPLE I

In this example one mold of di-n-butyl sulfoxide was placed in a glass lined rotating autoclave along with a solution of three moles of sodium hydroxide in about 1000 grams of a 95% aqueous ethyl alcohol and sealed. The contents thereof were then pressurized with nitrogen and heated to a temperature of about 150° C. and maintained in a range of from about 150° C. to about 200° C. for a period of five hours. At the end of this time, the contents thereof were allowed to cool to room temperature followed by discharge of the pressure to the atmosphere. Distillation of the reaction mixture to remove solvent, neutralization of the alkaline residue, and distillation of the organic products yielded n-butyl alcohol in 86 mole percent yield.

EXAMPLE II

In this example, the reaction mixture was prepared by adding 0.08 mole of di-β-phenylethyl sulfoxide to 0.24 mole of sodium hydroxide in solution with 121 g. 95% ethyl alcohol. The reaction mixture was sealed in the glass lined autoclave under 30 atmospheres of nitrogen and heated to a temperature from 150° C. to 200° C. during about five hours. Thereafter, the autoclave was cooled and discharged to the atmosphere. A good yield of a β-phenylethyl alcohol was obtained.

EXAMPLE III

A reaction mixture prepared by adding 0.1 mole n-hexyl phenyl sulfoxide to 0.3 mole sodium hydroxide in 102 g. 95% ethyl alcohol was heated from 150° to 200° C. in a glass lined autoclave under 30 atmospheres nitrogen pressure for a period of about five hours. Thereafter, the autoclave was cooled and discharged to the atmosphere. Subsequent work-up resulted in the isolation of n-hexyl alcohol in fair yield.

EXAMPLE IV

A glass lined rotatable autoclave has added thereto one mole of di-n-octyl sulfoxide along with 1000 cc. of a 95% ethyl alcohol solution and three moles of sodium hydroxide. Following this, the autoclave is sealed, pressurized with nitrogen, heated to a temperature of about 200° C. and maintained thereat for a period of approximately five hours. At the end of this time, the autoclave and contents thereof are allowed to cool to room temperature. The organic layer is separated and subjected to fractional distillation whereby the desired product comprising n-octyl alcohol is separated and recovered.

EXAMPLE V

In this example one mole of dicyclohexylethyl sulfoxide along with a solution of three moles of potassium hydroxide in about 1000 cc. of 95% isopropyl alcohol in a glass lined, sealed autoclave is heated to a temperature of about 200° C. The mixture is continuously rotated while being maintained at this temperature for a period of about five hours. At the end of this time, the vessel contents thereof are allowed to cool to room temperature, and after cooling, the organic layer is separated and subjected to fractional distillation under reduced pressure. The desired product comprising 2-cyclohexylethyl alcohol is separated and recovered.

EXAMPLE VI

In this example one mole of dibenzyl sulfoxide is subjected to a treatment similar in nature to that set forth in the above examples, that is, by treating one mole of the sulfoxide with a solution of three moles of sodium hydroxide in 1000 cc. of 95% ethyl alcohol. The mixture is heated to a temperature of about 150° C. and maintained at a range of from about 150° C. to about 200° C. for a period of five hours. Upon completion of the desired residence time, the reaction vessel and contents thereof are allowed to return to room temperature following which the organic layer is separated. Fractional distillation of the organic layer will permit separation and recovery of the desired product comprising benzyl alcohol.

EXAMPLE VII

A solution of three moles of sodium hydroxide in 1000 cc. of 95% of isopropyl alcohol is added to one mole of di-n-dodecyl sulfoxide. The resulting solution is heated to a temperature of about 200° C. and maintained thereto for a period of approximately five hours. Upon completion of the residence time, the vessel and contents thereof are allowed to cool to room temperature and the reaction mixture is treated in a manner similar to that set forth in the above examples. Fractional distillation of the organic layer will permit separation and recovery of the desired product comprising n-dodecyl alcohol.

I claim as my invention:

1. A process for converting a sulfoxide having the formula:

$$RS(O)R^1$$

in which R and $R^1$ are selected from the group consisting of alkyl, cycloalkyl, cycloalkylalkyl, aryl, aralkyl, alkaryl, and methylene groups of from 2 to 11 carbon atoms which together with the sulfur form a heterocyclic ring, which comprises treating said sulfoxide with an alkali or alkaline earth metal hydroxide in an aqueous alcoholic solvent at a temperature in the range of from about 100° C. to about 300° C. and recovering the resultant alcohol.

2. The process as set forth in claim 1, further characterized in that said alkali metal hydroxide comprises sodium hydroxide.

3. The process as set forth in claim 1, further characterized in that said alcoholic solvent comprises aqueous ethyl alcohol.

4. The process as set forth in claim 1, further characterized in that said alcoholic solvent comprises aqueous isopropyl alcohol.

5. The process as set forth in claim 1, further characterized in that said sulfoxide comprises di-n-butyl sulfoxide and said primary alcohol comprises n-butyl alcohol.

6. The process as set forth in claim 1, further characterized in that said sulfoxide comprises di-β-phenylethyl sulfoxide and said primary alcohol comprises β-phenylethyl alcohol.

7. The process as set forth in claim 1, further characterized in that said sulfoxide comprises n-hexyl phenyl sulfoxide and said primary alcohol comprises n-hexyl alcohol.

8. The process as set forth in claim 1, further characterized in that said sulfoxide comprises dibenzyl sulfoxide and said primary alcohol comprises benzyl alcohol.

9. The process as set forth in claim 1, further characterized in that said sulfoxide comprises di-n-dodecyl sulfoxide and said primary alcohol comprises n-dodecyl alcohol.

References Cited

UNITED STATES PATENTS 3,418,382 12/1968 Dombro _____ 260—632
3,459,813 8/1969 Dombro _____ 260—632

OTHER REFERENCES

Kharasch, Organic Sulfur Compounds, vol. I (1961), pages 173–176.

"Dimethyl Sulfoxide Reaction Medium and Reactant" (1962) Crown Zellerbach Corp., pages 1–40.

BERNARD HELFIN, Primary Examiner

U.S. Cl. X.R.

260—617, 621, 622, 632, 633